United States Patent

Iwashita et al.

(10) Patent No.: US 6,325,385 B1
(45) Date of Patent: Dec. 4, 2001

(54) PISTON RING

(75) Inventors: Takatsugu Iwashita, Matsumoto; Nobuyuki Yamashita, Shiojiri, both of (JP)

(73) Assignee: Teikoku Piston Ring Co., Ltd., Tokyo (JP)

( * ) Notice: Subject to any disclaimer, the term of this patent is extended or adjusted under 35 U.S.C. 154(b) by 0 days.

(21) Appl. No.: 09/352,345

(22) Filed: Jul. 13, 1999

(30) Foreign Application Priority Data

Oct. 15, 1998 (JP) ................................................ 10-309442

(51) Int. Cl.$^7$ ........................................................ F16J 9/26
(52) U.S. Cl. .......................... 277/442; 277/443; 277/444; 277/938; 277/943
(58) Field of Search .................................... 277/440, 442, 277/443, 444, 938, 943

(56) References Cited

U.S. PATENT DOCUMENTS

| | | | |
|---|---|---|---|
| 3,595,590 | * | 7/1971 | Beyer ..................................... 277/444 |
| 3,615,099 | * | 10/1971 | Prasse ..................................... 277/444 |
| 3,770,286 | * | 11/1973 | Angilella et al. ..................... 277/444 |
| 3,909,252 | * | 9/1975 | Kuriyama et al. .................. 75/128 B |
| 3,932,228 | * | 1/1976 | Sugiyama et al. ..................... 204/26 |
| 4,859,493 | * | 8/1989 | Lemelson ............................. 427/45.1 |
| 4,974,498 | | 12/1990 | Lemelson . |
| 5,190,823 | * | 3/1993 | Anthony et al. ..................... 428/408 |
| 5,237,967 | | 8/1993 | Willermet et al. . |
| 5,370,195 | * | 12/1994 | Keshavan et al. ................. 175/420.2 |
| 5,382,293 | * | 1/1995 | Kawarada et al. ............ 118/723 DC |
| 5,531,195 | * | 7/1996 | Onoda et al. ...................... 123/193.6 |
| 5,582,414 | * | 12/1996 | Miyazaki et al. ..................... 277/444 |
| 5,601,293 | * | 2/1997 | Fukutome et al. ..................... 277/444 |
| 5,712,000 | * | 1/1998 | Wei et al. ............................. 427/573 |
| 5,786,038 | | 7/1998 | Conley et al. . |
| 5,879,816 | * | 3/1999 | Mori et al. ............................. 428/621 |
| 6,046,758 | * | 4/2000 | Brown et al. ......................... 347/203 |
| 6,083,570 | * | 7/2000 | Lemelson et al. .................... 427/554 |

FOREIGN PATENT DOCUMENTS

| | | |
|---|---|---|
| 0 905 419 A2 | 3/1999 | (EP) . |
| 0 905 420 A2 | 3/1999 | (EP) . |
| 3-260362 | 11/1991 | (JP) . |
| 5-179451 | 7/1993 | (JP) . |
| 5-54594 | 8/1993 | (JP) . |
| 8-184375 | 7/1996 | (JP) . |

* cited by examiner

Primary Examiner—Lynne H. Browne
Assistant Examiner—Alison K. Pickard
(74) Attorney, Agent, or Firm—Armstrong, Westerman, Hattori, McLeland & Naughton, LLP (57) ABSTRACT

A piston ring has a diamond-like carbon film formed in a thickness of 0.5 to 30 micrometers over an under film on the upper and lower surfaces. The under film is directly formed on the surfaces, or formed on a hard surface treatment layer consisting of a gas nitrided layer or a chromium plating film. The diamond-like carbon is configured with any one of an amorphous carbon structure, an amorphous carbon structure having partly a diamond structure, or an amorphous carbon structure having partly a graphite structure. The under film is comprised of one or more elements selected from the group consisting of silicon, titanium, tungsten, chromium, molybdenum, niobium and vanadium in an atomic content of 70 percent or more and below 100 percent, and the remaining content consisting of carbon, or one or more of said elements in an atomic content of 100 percent. The films may also be formed in the same way on the outer circumferential surface of the piston ring.

16 Claims, 5 Drawing Sheets

PISTON RING

BACKGROUND OF INVENTION

1. Technical Field of Invention

The present invention relates to a piston ring for use in internal combustion engines.

2. Description of Related Art

In recent years, engines must meet increased demands for higher output, high revolutions per minute and longer product service life and must also comply with ever stricter exhaust gas emission regulations. The piston ring must therefore function in a yet harsher operating environment. Many of such piston rings are formed typically with a hard surface treatment layer such as chromium plating film, nitrided layer or physical vapor deposition film on the upper and lower surfaces and the outer circumferential surface.

However, piston rings having a nitrided layer or physical vapor deposition film are prone to wear the ring grooves of the aluminum alloy pistons. In particular, piston rings having nitrided layers are prone to cause aluminum adhesion on the upper and lower surfaces, increasing the wear on the ring grooves.

In the initial stage of engine operation, break-in between the cylinder and piston ring is not sufficient so that scuffing may occur between the cylinder and piston ring formed with the above mentioned hard surface treatment layer. Accordingly, a method to improve initial break-in characteristics of these hard surface treatment layers or a hard surface treatment layer having both scuffing resistance and wear resistance is needed.

To respond the above problem, the following arts have been proposed.

1. Japanese Patent Laid-open No. 8-184375

A film of either 98.0 to 99.5 percent molybdenum or chromium or both and the remainder of nitrogen was formed by physical vapor deposition on a nitrided layer or physical vapor deposition film in order to improve the initial break-in characteristics.

2. Japanese Patent Publication No. 5-54594

A TiN film was formed over a hard film comprised of CBN, TiC, Ti (C,N), SiC, diamonds or $Al_2O_3$ in order to improve the scuffing resistance.

On the other hand, the following art involved coating of artificial diamond material has been proposed.

3. Japanese Patent Laid-open No. 3-260362

A thin film of artificial diamond material was formed on the piston ring and on the top surface, external circumferential surface and ring groove of the piston in order to improve durability.

Further, the following art involved use of a diamond-like carbon film has been proposed.

4. Japanese Patent Laid-open No. 5-179451

In order to restrict the adhesion of ferrite structures, a film having amorphous carbon as the main constituent in which tungsten and/or silicon was dispersed was formed on the sliding surface which mates with a sliding surface formed of iron-type material containing ferrite. This technology is utilized for instance, in the hydraulic valve in power steering mechanisms.

However, under harsh engine operating conditions, the technology proposed in the above first method has the drawback that the molybdenum or chromium film wears away quickly. The technology proposed in the above second method has a TiN film with excessive hardness so that resistance to scuffing is inadequate. The technology proposed in the above third method has no detailed description of any kind regarding the thin film of artificial diamond material. The technology proposed in the above fourth method provides no description of aluminum adhesion on the upper and lower surfaces of the piston rings mating with aluminum alloy pistons. Besides the above mentioned technologies, a method is known, for suppressing aluminum adhesion in the initial stages of engine operation by coating the upper and lower surfaces of the piston ring with a synthetic resin film containing solid lubricant. However, this synthetic resin film has poor wear resistance, so this method has the drawback that suppression of the aluminum adhesion does not last long.

SUMMARY OF INVENTION

It is an object of the present invention to provide a piston ring with superior sliding characteristics such as resistance to aluminum adhesion, resistance to scuffing and initial break-in characteristics.

The present invention is a piston ring covered on a sliding surface of the piston ring with a diamond-like carbon film, wherein an under film is formed beneath the diamond-like carbon film and is comprised of one or more elements selected from the group consisting of silicon, titanium, tungsten, chromium, molybdenum, niobium and vanadium in an atomic content of 70 percent or more and below 100 percent, and the remaining content consisting of carbon, or one or more of said elements in an atomic content of 100 percent.

The diamond-like carbon forming a film of the present invention is configured from any one of the following structures.

1. Amorphous carbon structure
2. Amorphous carbon structure having partly a diamond structure.
3. Amorphous carbon structure having partly a graphite structure.

The sliding surface is the upper, lower or outer circumferential surfaces of the piston ring. The film of the present invention covers at least one surface of the upper, lower and outer circumferential surfaces of the piston ring.

The sliding surface of the piston ring of the present invention comprises a laminated structure of piston ring base material, under film, and diamond-like carbon film; or a laminated structure of piston ring base material, hard surface treatment layer, under film, and diamond-like carbon film. The hard surface treatment layer may be a chromium plating film, a nitrided layer or an ion plating film.

The resistance to aluminum adhesion, wear resistance and scuffing resistance of the diamond-like carbon film are inherently high, however a film having improved scuffing resistance, improved wear resistance and improved resistance to aluminum adhesion can be obtained by including one or more elements in an atomic content of 5 to 40 percent selected from the group consisting of silicon, titanium, tungsten, chromium, molybdenum, niobium, and vanadium. The one or more elements are present as metal or carbides or both.

The under film is firmly bonded to the piston ring base material or the hard surface treatment layer of any one of chromium plating film, nitrided layer and ion plating film, and also bonded to the diamond-like carbon film. The under film simultaneously alleviates strain occurring internally in the diamond-like carbon film.

Accordingly, the diamond-like carbon film of the present invention has high adhesive strength and is not prone to generate defects such as cracks, film collapse or pits during use.

The thickness of the under film is preferably within a range of 1 to 35 percent of the sum of the diamond-like carbon film thickness and the under film thickness. When the thickness is below 1 percent, the effect of alleviating strain occurring internally in the diamond-like carbon film can not be achieved. When the thickness exceeds 35 percent, the protective effect of the hard surface treatment layer that protects the diamond-like carbon film from the rear against deformation or loads from the sliding surface side can not be obtained. Further, the scuffing resistance of the under film exposed after wear of the diamond-like carbon film is poor so that the scuffing resistance becomes low.

The under film of the present invention has a film thickness taking resistance to scuffing into account, and quickly wears away not to deteriorate resistance to scuffing after the diamond-like carbon film has fulfilled its job in the initial break-in period and worn away.

The hard surface treatment layer consisting of any one of a chromium plating film, a nitrided layer or an ion plating film has a high level of hardness and can protect the diamond-like carbon film from the rear against deformation or loads from the sliding surface side and can keep the piston ring resistant to wear after the diamond-like carbon film and under film have worn away.

The piston ring of the present invention as explained above, has a diamond-like carbon film with superior adhesive strength and has superior resistance to aluminum adhesion, resistance to scuffing and initial break-in characteristics, and is particularly effective on cylinder bores and piston ring grooves of aluminum alloys.

BRIEF DESCRIPTION OF DRAWINGS

FIGS. 5A and 5B are drawings showing the structure of the pin-on-cylinder friction testing machine.

DESCRIPTION OF PREFERRED EMBODIMENTS

Hereafter, the embodiments of the present invention are explained while referring to FIGS. 1A through 1C and FIGS. 2A through 2B.

Figure 1A:
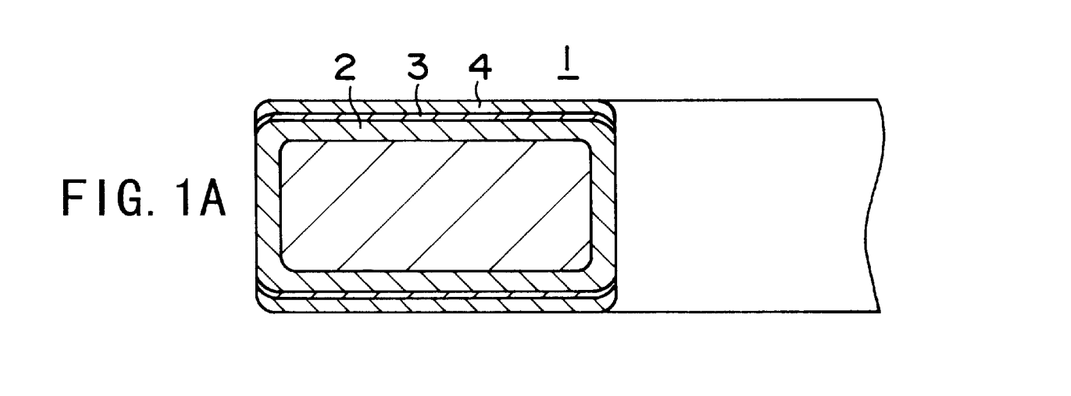
FIGS. 1A, 1B and 1C are respectively longitudinal cross sectional views of a portion of the piston rings illustrating embodiments of the present invention.

In FIG. 1A, a piston ring 1 is formed over the entire surface with a gas nitrided layer 2 in a thickness of 5 to 150 micrometers. A diamond-like carbon film 4 containing one or more elements in an atomic content of 5 to 40 percent selected from the group consisting of silicon, titanium, tungsten, chromium, molybdenum, niobium and vanadium is formed in a thickness of 0.5 to 30 micrometers over the under film 3 formed on the gas nitrided layer 2 at the upper and lower surfaces. The diamond-like carbon film 4 has a Vicker's hardness in a range of HV700 to HV2000. The under film 3 is comprised of one or more elements selected from the group consisting of silicon, titanium, tungsten, chromium, molybdenum, niobium and vanadium in an atomic content of 70 percent or more and below 100 percent, and the remaining content consisting of carbon, or one or more of said elements in an atomic content of 100 percent. The thickness of the under film 3 is within a range of 1 to 35 percent of the sum of the diamond-like carbon film 4 thickness and the under film 3 thickness.

Figure 1B:
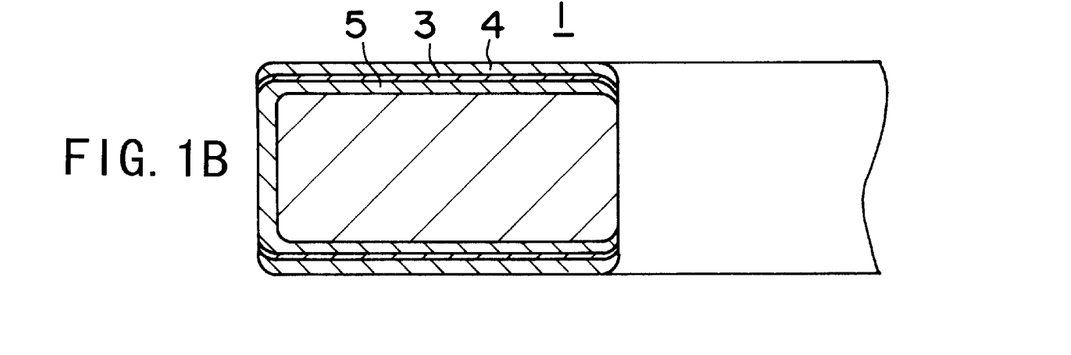

Another example is shown in FIG. 1B in which a chromium plating film 5 is formed on the outer circumferential surface and upper and lower surfaces in a thickness of 1 to 150 micrometers instead of the gas nitrided layer 2 formed over the entire surface in FIG. 1A.

Figure 1C:
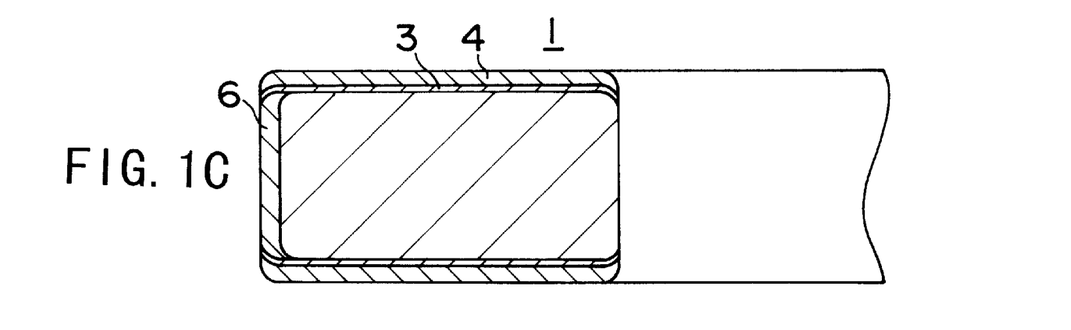

Yet another example is shown in FIG. 1C in which an ion plating film 6 such as of chromium nitride (CrN, $Cr_2N$) or titanium nitride (TiN) is formed on the outer circumferential surface instead of the gas nitrided layer 2 formed over the entire surface in FIG. 1A.

In FIGS. 1A through 1C, the under film 3 and the diamond-like carbon film 4 were formed on the upper and lower surfaces of the piston ring 1, however the under film 3 and the diamond-like carbon film 4 may be formed on just one surface of either the upper or lower surface.

Figure 2A:
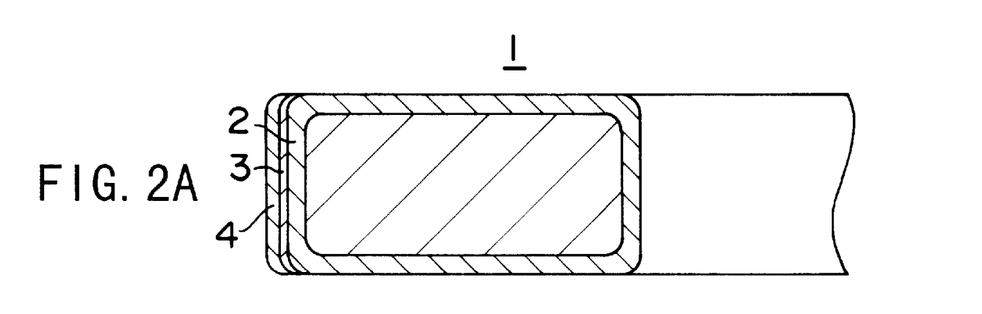
FIGS. 2A and 2B are respectively longitudinal cross sectional views of a portion of the piston rings illustrating embodiments of the present invention.

In FIG. 2A, a piston ring 1 is formed over the entire surface with a gas nitrided layer 2 in a thickness of 5 to 150 micrometers. A diamond-like carbon film 4 containing one or more elements in an atomic content of 5 to 40 percent selected from the group consisting of silicon, titanium, tungsten, chromium, molybdenum, niobium and vanadium is formed in a thickness of 0.5 to 30 micrometers over the under film 3 formed on the gas nitrided layer 2 at the outer circumferential surface. The diamond-like carbon film 4 has a Vicker's hardness in a range of HV700 to HV2000. The under film 3 is comprised of one or more elements selected from the group consisting of silicon, titanium, tungsten, chromium, molybdenum, niobium and vanadium in an atomic content of 70 percent or more and below 100 percent, and the remaining content consisting of carbon, or one or more of said elements in an atomic content of 100 percent. The thickness of the under film 3 is within a range of 1 to 35 percent of the sum of the diamond-like carbon film 4 thickness and the under film 3 thickness.

Figure 2B:
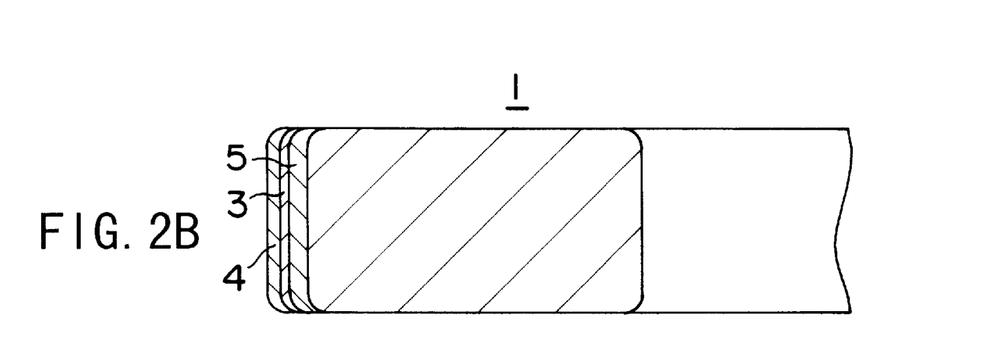

Another example is shown in FIG. 2B in which a chromium plating film 5 is formed on the outer circumferential surface in a thickness of 5 to 150 micrometers instead of the gas nitrided layer 2 formed over the entire surface in FIG. 2A.

The manufacturing method for the under film 3 and the diamond-like carbon film 4 is explained next. The under film 3 and the diamond-like carbon film 4 can be applied by a physical vapor deposition process such as reactive ion plating process or reactive sputtering process. An example is related below.

A piston ring is placed in a reactive sputtering device, and after raising a vacuum, an inert gas such as argon gas is introduced into the device while the piston ring is rotated, and the surface of the piston ring is cleaned by ion bombardment. A metal target of one or more elements selected from the group consisting of silicon, titanium, tungsten, chromium, molybdenum, niobium and vanadium is then sputtered with ions such as argon in a carbonic type gas environment, for example a hydrocarbon such as methane gas environment, and the vaporized metal is formed as an under film on the piston ring. The ratio of the respective contents of the one or more elements selected from the group consisting of silicon, titanium, tungsten, chromium, molybdenum, niobium and vanadium can be adjusted by changing the flow rate of the hydrocarbon gas. The carbonic type gas is not required when the under film is comprised of the one or more metallic elements in an atomic content of 100 percent.

After forming the under film as described above, the hydrocarbon gas flow rate, and the vaporizing speed of the metal from the metal target of one or more elements selected from the group consisting of silicon, titanium, tungsten, chromiumn, molybdenum, niobium and vanadium are adjusted. The diamond-like carbon film is then formed on the under film.

The ratio of the respective contents of the one or more elements selected from the group consisting of silicon, titanium, tungsten, chromium, molybdenum, niobium, and vanadium can be controlled by adjusting the pressure of the reactive gas as well as the evaporation speed of these elements.

Hereafter, the results of a microwelding test to evaluate adhesive strength of the diamond-like carbon film and the scuffing test in the piston ring of the present invention are explained.

Table 1 shows films applied by the previously related method onto a 13Cr stainless steel piston ring. The films are formed in the sequence of hard surface treatment layer, under film and diamond-like carbon film from the piston ring base material.

The hardness and other items of the hard surface treatment layer for Table 1 are shown next.

The gas nitrided layer has a Vicker's hardness of HV1100, and the thickness of 50 micrometers. The chromium plating film has a Vicker's hardness of HV950, and plating thickness of 70 micrometers. The ion plating film is a CrN film with a Vicker's hardness of HV1800, and film thickness of 30 micrometers.

The respective metal contents contained in the diamond-like carbon film in Table 1 are as follows.

Embodiments 1, 3 and 6 and comparative example 4:

silicon 15 atomic percent

Embodiments 2 and 5 and comparative examples 2 and 5 chromium 30 atomic percent

Embodiment 4 and comparative examples 3 and 6 titanium 10 atomic percent

Note 1: The DLC film of Table 1 is the diamond-like carbon film.

Note 2: The under film thickness % of Table 1 is the under film thickness ratio for the sum of the diamond-like carbon film thickness and the under film thickness.

TABLE 1

| NO. | HARD SURFACE TREATMENT LAYER | UNDER FILM | METAL CONTENT IN UNDER FILM ATOMIC % | UNDER FILM THICKNESS μm | DLC FILM THICKNESS μm | UNDER FILM THICKNESS % |
|---|---|---|---|---|---|---|
| EMBODIMENT | | | | | | |
| 1 | Gas nitrided layer | Si | 100 | 0.05 | 4.95 | 1 |
| 2 | Gas nitrided layer | Cr | 90 | 0.25 | 4.75 | 5 |
| 3 | Chromium plating film | Si | 70 | 0.5 | 4.5 | 10 |
| 4 | Gas nitrided layer | Ti | 100 | 1.25 | 3.75 | 25 |
| 5 | Gas nitrided layer | Cr | 100 | 1.75 | 3.25 | 35 |
| 6 | Ion plating film | Si | 80 | 1.0 | 4.0 | 20 |
| COMPARATIVE EXAMPLE | | | | | | |
| 1 | Gas nitrided layer | — | — | — | — | — |
| 2 | Gas nitrided layer | Cr | 65 | 0.5 | 4.5 | 10 |
| 3 | Gas nitrided layer | Ti | 50 | 0.5 | 4.5 | 10 |
| 4 | Gas nitrided layer | Si | 100 | 0.025 | 4.975 | 0.5 |
| 5 | Gas nitrided layer | Cr | 100 | 2.0 | 3.0 | 40 |
| 6 | Gas nitrided layer | Ti | 100 | 2.5 | 2.5 | 50 |

1. Microwelding test

Microwelding tests were performed utilizing the piston rings formed on the upper and lower surfaces with the under film and diamond-like carbon film, on the entire surface with the gas nitrided layer, and on the upper and lower surfaces with the chromium plating film or ion plating film in Table 1.

(1) Microwelding tester

Figure 3:
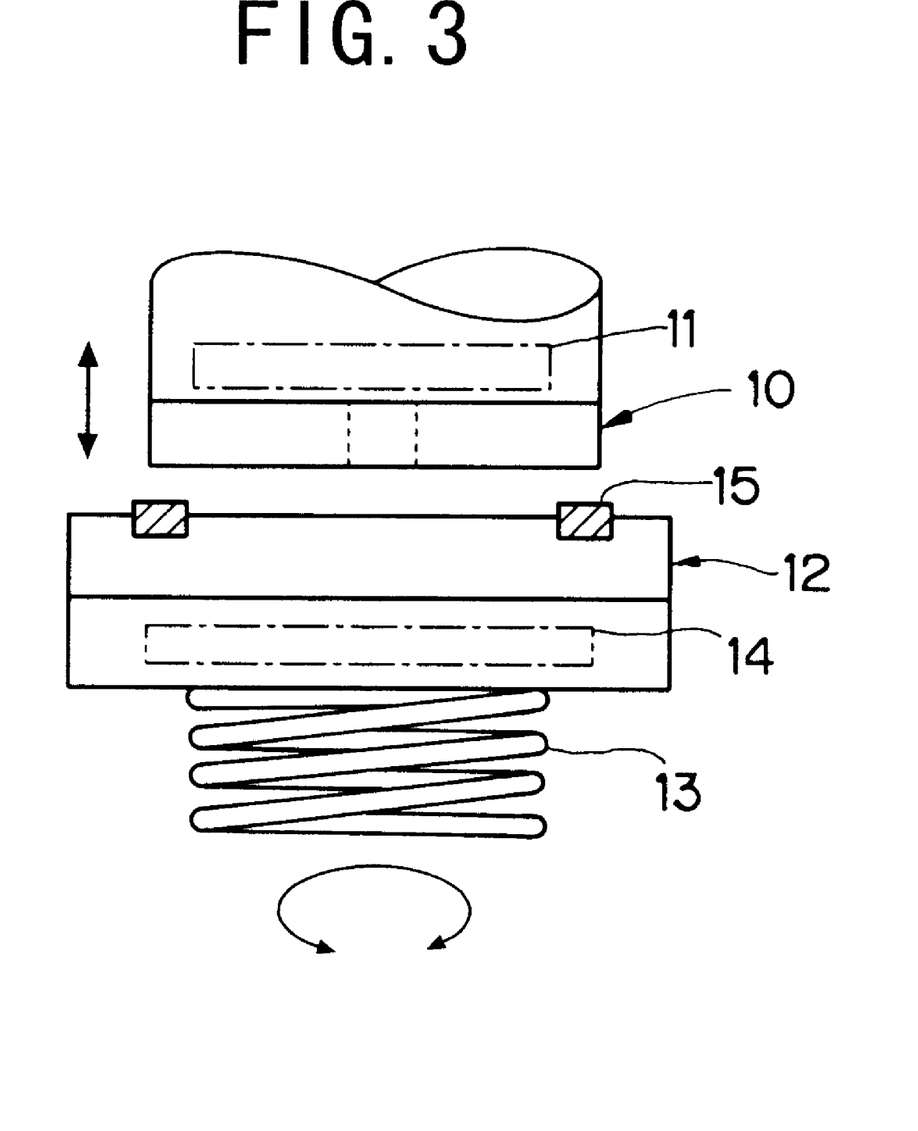
FIG. 3 is a drawing showing a configuration of the microwelding tester.
Figure 4:
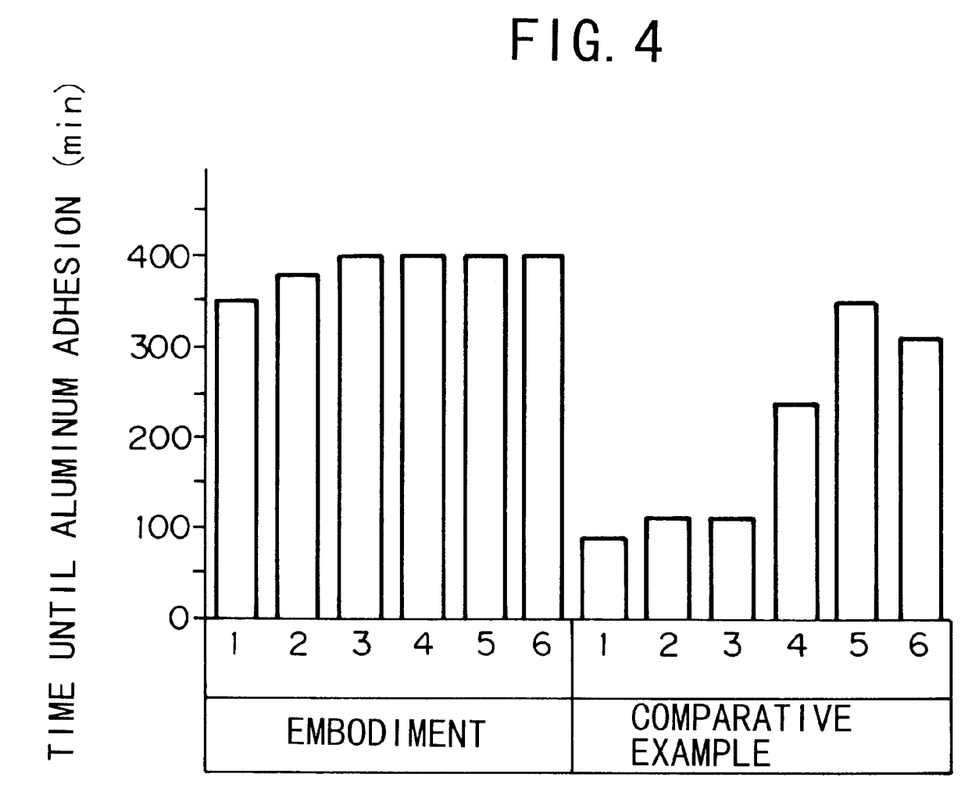
FIG. 4 is a graph showing test results from the microwelding tests.

The structure of a microwelding tester is shown in FIG. 3. An upward and downward moving aluminum alloy (AC8A) piston member 10 (ø86mm×thickness 10mm) is provided with a heater 11. A test piece support member 12 supported by a spring 13 is disposed at a position below the piston member 10, and has an annular groove on the upper surface and has a heater 14. A test piece 15 which is a piston ring is mounted in the annular groove of the test piece support member 12 and is supported in a state slightly protruding from the upper surface of the test piece support member 12. The test piece support member 12 repeatedly rotates and reverses in a horizontal plane in 180°. Therefore, the test piece 15 which is the piston ring is tapped by the flat bottom of the upward and downward moving piston member 10 while repeatedly rotated and reversed in a horizontal plane in 180° by the test piece support member 12.

(2) Test conditions

Tap load: 1000 N

Tap speed: 900 r.p.m.

Rotation speed of piston member: 15 c.p.m., 180°

Test temperature: 200° C.

Lubricant: Dropping of 10W engine oil (3) Test results

As shown in Table 4, all of the piston rings formed with the films of the embodiments had superior resistance to aluminum adhesion.

2. Scuffing test

Scuffing tests were performed utilizing the piston rings formed on the outer circumferential surface with the under film and diamond-like carbon film, on the entire surface with the gas nitrided layer, and on the outer circumferential surface with the chromium plating film or ion plating film in Table 1.

(1) Pin-on-cylinder friction testing machine

Figure 5A:
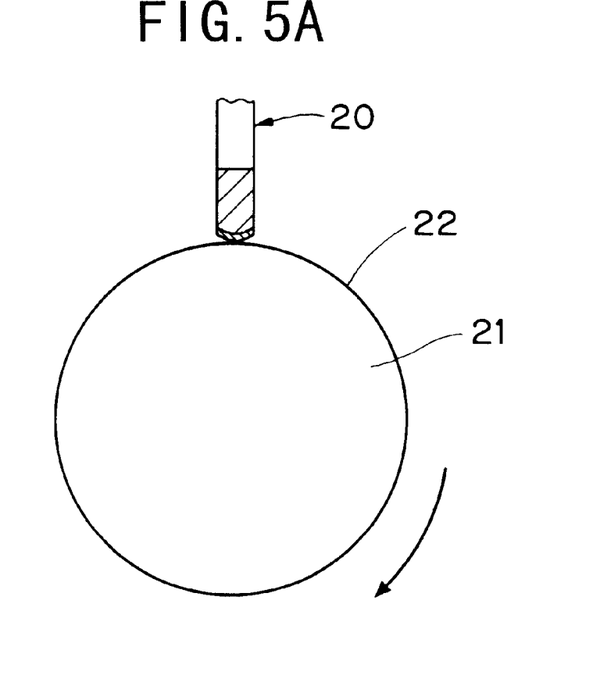
FIG. 5A is a front view partly in cross section.
Figure 5B:
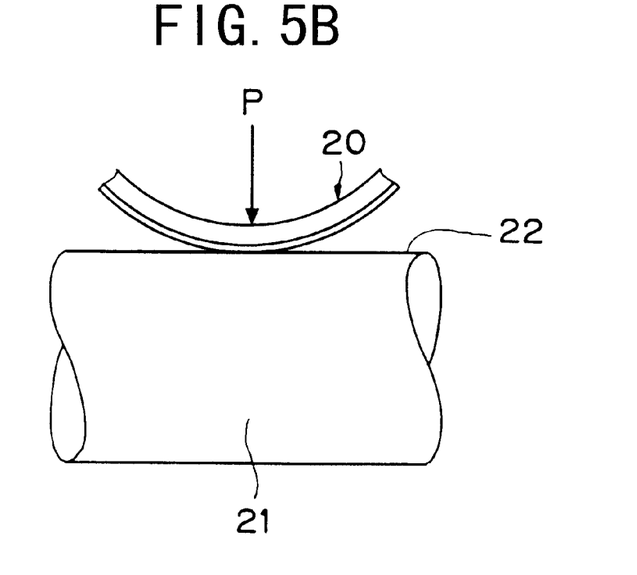
FIG. 5B is a side view.

The structure of the pin-on-cylinder friction testing machine used in the scuffing test is shown in FIGS. 5A and 5B. A test piece 20 as the piston ring is mounted on the upper end of the outer circumferential surface 22 of a rotor 21 rotated around the horizontal axis. A load P is applied to the test piece 20 which is the piston ring, pressing the piston ring against the outer circumferential surface of the rotor 21. The rotor 21 is rotated in this state, while supplying lubricating oil to the contact portion between the rotor 21 and the test piece 20 as the piston ring. The test piece was observed for the presence or absence of scuffing on the sliding surface after the testing machine was operated for specified times at a fixed load.

(2) Test conditions

Rotation speed: 1000 r.p.m.

Load 150 N

Time 60 seconds

Lubricating oil Dropping of 10 W engine oil

Temperature Room temperature (3) Rotor 21

Material: Flake graphite cast iron (4) Test results

The piston ring on which was formed the film of the embodiment had superior scuffing resistance as shown in Table 2. In contrast, the scuffing resistance was low in the comparative example 1 having only the gas nitrided layer, the comparative examples 2 and 3 having an under film with a metal content outside the range of the present invention, and the comparative examples 4, 5 and 6 having an under film thickness ratio outside the range of the present invention for the sum of the diamond-like carbon film thickness and the under film thickness.

TABLE 2

|  | NO. | SCUFFING OCCURRENCE |
|---|---|---|
| EMBODIMENT | 1 | No scuffing |
|  | 2 | No scuffing |
|  | 3 | No scuffing |
|  | 4 | No scuffing |

TABLE 2-continued

|  | NO. | SCUFFING OCCURRENCE |
|---|---|---|
|  | 5 | No scuffing |
|  | 6 | No scuffing |
| COMPARATIVE EXAMPLE | 1 | Scuffing |
|  | 2 | Scuffing |
|  | 3 | Scuffing |
|  | 4 | Scuffing |
|  | 5 | Scuffing |
|  | 6 | Scuffing |

The test results in the above test are shown for the under film containing silicon, chromium and titanium respectively, however in the under film containing any of tungsten, molybdenum, niobium and vanadium, or in the under film containing two or more elements selected from the group consisting of silicon, titanium, tungsten, chromium, molybdenum, niobium, and vanadium, the same results as before can be obtained.

Although the present invention has been described with reference to the preferred embodiments, it is apparent that the present invention is not limited to the aforesaid preferred embodiments, but various modification can be attained without departing from its scope.

What is claimed is:

1. A piston ring having a diamond-like carbon film on a sliding surface of said piston ring, wherein an under film is formed beneath said diamond-like carbon film, and consists of one or more elements selected from the group consisting of silicon, titanium, tungsten, chromium, molybdenum, niobium and vanadium in an atomic content of 70 percent or more and below 100 percent, and the remaining content consisting of carbon; or one or more elements selected from the group consisting of silicon, titanium, tungsten, chromium, molybdenum, niobium and vanadium in an atomic content of 100 percent, and the thickness of said under film is within a range of 1 to 35 percent of the sum of said diamond-like carbon film thickness and said under film thickness, and said diamond-like carbon film is worn and said under film is exposed during use of said piston ring.

2. A piston ring as claimed in claim 1, wherein said under film is formed over a hard surface treatment layer of any one of a chromium plating film, a nitrided layer and an ion plating film.

3. A piston ring as claimed in claim 1, wherein said under film is directly formed on the sliding surface of said piston ring.

4. A piston ring as claimed in claim 1, wherein said sliding surface is at least one surface of the upper and lower surfaces of said piston ring.

5. A piston ring as claimed in claim 1, wherein said sliding surface is the outer circumferential surface of said piston ring.

6. A piston ring as claimed in claim 1, wherein the thickness of said under film is less than 2 $\mu$m.

7. A piston ring as claimed in claim 6, wherein said diamond-like carbon film contains one or more elements selected from the group consisting of silicon, titanium, tungsten, chromium, molybdenum, niobium and vanadium in an atomic content of 5 to 40 percent.

8. A piston ring as claimed in claim 6, wherein said under film is formed over a hard surface treatment layer of any one of a chromium plating film, a nitrided layer and an ion plating film.

9. A piston ring as claimed in claim 6, wherein said under film is directly formed on the sliding surface of said piston ring.

10. A piston ring as claimed in claim 6, wherein said sliding surface is at least one surface of the upper and lower surfaces of said piston ring.

11. A piston ring as claimed in claim 6, wherein said sliding surface is the outer circumferential surface of said piston ring.

12. A piston ring as claimed in claim 1, wherein said diamond-like carbon film contains one or more elements selected from the group consisting of silicon, titanium, tungsten, chromium, molybdenum, niobium and vanadium in an atomic content of 5 to 40 percent.

13. A piston ring as claimed in claim 12, wherein said under film is formed over a hard surface treatment layer of any one of a chromium plating film, a nitrided layer and an ion plating film.

14. A piston ring as claimed in claim 12, wherein said under film is directly formed on the sliding surface of said piston ring.

15. A piston ring as claimed in claim 12, wherein said sliding surface is at least one surface of the upper and lower surfaces of said piston ring.

16. A piston ring as claimed in claim 12, wherein said sliding surface is the outer circumferential surface of said piston ring.

* * * * *